United States Patent Office 3,734,784
Patented May 22, 1973

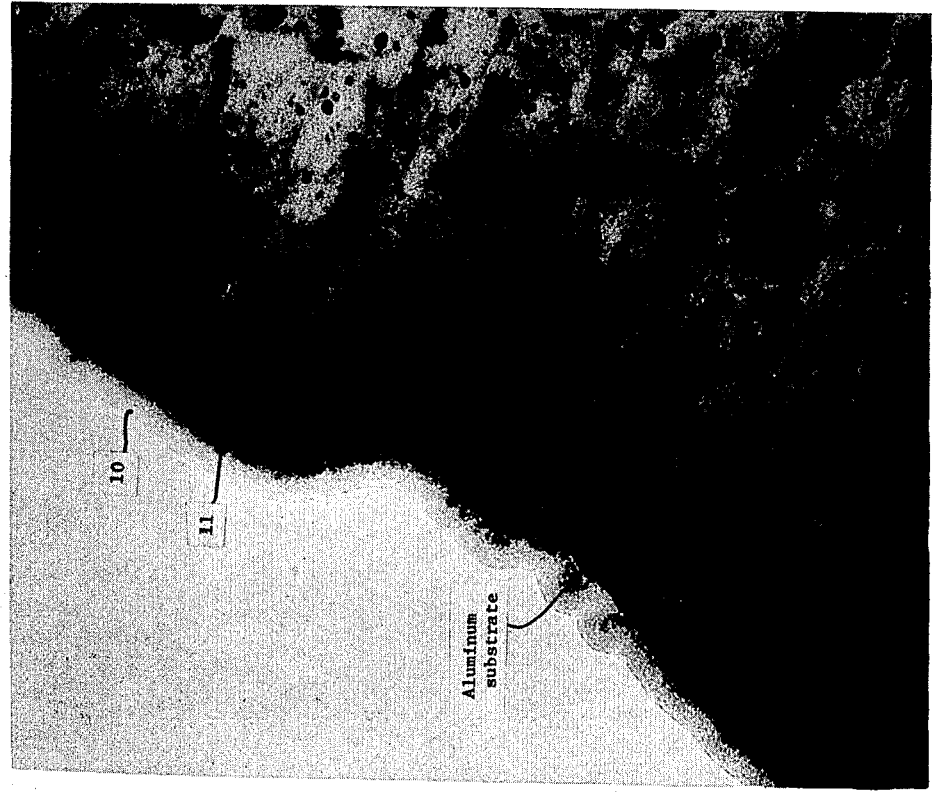
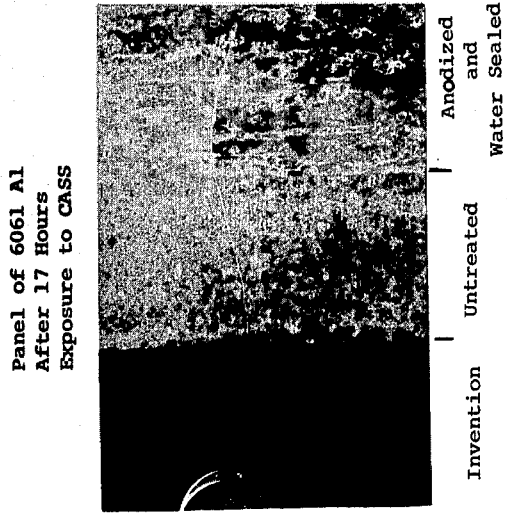

3,734,784
TREATING ALUMINUM SURFACES
Sigmund Bereday, R.F.D. 33–U 1, Loiza Station, San Juan, Puerto Rico 00914, and Edwin S. Kolic, Gahanna, Garson A. Lutz, Columbus, and Henry M. Grotta, Delaware, Ohio, and John H. Gibbs, San Juan, Puerto Rico; said Kolic, Lutz, Grotta, and Gibbs assignors to said Bereday
Filed Jan. 14, 1970, Ser. No. 2,883
Int. Cl. C23f 7/00; B32b 15/20
U.S. Cl. 148—6.27        20 Claims

ABSTRACT OF THE DISCLOSURE

A treated aluminum surface is provided having chemically bonded thereto an organic film comprising at its bonding interface a reaction product of a functional group of an organic compound and an active hydrated amorphous layer of aluminum oxide integral with the aluminum surface, the organic compound having at least 8 carbon atoms and being characterized by said functional group which reacts with an aliphatic alcohol, the active hydrated amorphous layer of aluminum oxide being characterized chemically in that it reacts like an alcohol with the functional group of said organic compound.

---

This invention relates to aluminum articles having strongly bonded organic films on the surface thereof, and also to an improved method for chemically converting aluminum surfaces whereby to provide new and improved chemical, physical, mechanical and electrical properties and also aesthetic qualities which enhance the utility and economy of aluminum in a wide variety of applications.

The term "aluminum" employed herein includes high purity aluminum, the various commercial grades of aluminum and aluminum-base alloys and composite materials in which aluminum in a suitable form (e.g. coating, filaments, powder, etc.) is employed as an element of the composite.

STATE OF THE ART

The tremendous growth of aluminum as a versatile engineering material in the past decade has stimulated the development of many types of surface finishing techniques to meet the rigorous demands of the market. Examples of products into which aluminum has made large inroads include trims (e.g. extruded moldings), bumpers for automobiles, exterior and interior wall panels for buildings, window frames and screening, awnings, skin panels for aircraft, as well as aircraft supporting members (e.g. struts, interior panels, lightweight girders, angles, flaps, and the like), radiators, engines, electrical components, lighting fixtures, luggage, packaging components and cans for foods, furniture, home appliances, including cooking utensils, boats, sheet metal products for conversion into a variety of shapes, foil, dielectric components, and a vast number of other aluminum or aluminum-containing products, be they molded, drawn, stamped, extruded, wrought, and the like.

Aluminum owes its versatility as an engineering material to its easy workability, its somewhat low specific gravity (i.e. 2.7 grams/cc.) compared to steel and similar metals and to the fact that it has a much greater corrosion resistance to the ambient environment than steel. Its remarkable resistance to corrosion is due to the formation of a substantially transparent oxide layer, i.e. "natural oxide," upon exposure to air. This natural oxide is not always uniform and, because of this, aluminum products are generally cleaned of such oxides and thereafter controllably oxidized to provide a protective oxide layer of better quality. This technique is referred to in the art as the anodizing process. Such processes involve the use of baths containing as an electrolyte, by way of example, sulfuric acid, chromic acid, phosphoric acid, or combinations thereof, with or without certain addition agents. Anodizing is generally accomplished by making the aluminum component the anode and passing a direct or alternating current through the electrolyte. A typical anodizing bath is one containing by weight from about 10% to 20% of sulfuric acid. The operating temperature may range from about 68° F. to 72° F. and, where a direct current of about 5 to 20 volts is used, the current density may range from about 10 to 15 amperes per square foot, the thickness of the anodic film being determined by the duration of the anodizing step.

While such anodizing treatments generally impart satisfactory overall corrosion resistance to aluminum, they suffer from several disadvantages. One disadvantage is the strict control which must be exercised over operating conditions to insure effective coating. A second disadvantage is that during anodizing in commercial electrolytes, such as in sulfuric acid, pores tend to form in the oxide layer due to the continuous solvent action of the acid during formation of the layer, the dimensions of the pores being apparently related to the oxidizing potential. For example, it has been found that with a 15% sulfuric acid bath, pore diameters of approximately 150 angstroms have been obtained. The number of pores has been determined to range up to as high as about $400 \times 10^9$ pores per square inch of anodic surfaces, the volume occupied by the pores having been found to range from about 5 to 15% by volume of the total volume of the film. Pores are not desirable in that they tend to permit corrosion to occur in small areas giving rise to deep pits as evidenced by corrosion by-products in the form of blooms or white spots on the surface of the aluminum which have an adverse effect on the quality of surface finish.

A third disadvantage of anodic coatings is their tendency towards brittleness, particularly where hard coatings are produced in sulfuric or oxalic acid at or below room temperature. The hardness of the films is comparable to that of corundum and such films are subject to crazing due to the difference in thermal expansion between the oxide coating and the aluminum substrate or due to flexing in use.

A fourth disadvantage is that high quality anodized coatings are expensive to produce.

A still further disadvantage is the discoloration and darkening that occurs on aluminum alloys that contain copper, iron, silicon and other elements that form colored oxide with aluminum.

Many methods have been proposed to overcome the foregoing disadvantage attributed to conventionally produced anodized coatings. One method which has received some prominence is referred to as the sealing process, the term "sealing" implying the sealing of the pores in the oxide coating to exclude environmental moisture and impurities from entering the coating and setting up minute electrolytic cells which tend to increase corrosion rates in restricted areas. This method comprises treating anodized aluminum by dipping it in boiling hot water or by exposing it to steam so as to form an aluminum oxide monohydrate in the pores, as a result of which a 10 to 20% increase in volume obtains in the film. The pores are believed to be substantially closed off from the environment with this treatment. The aluminum monohydrate formed has a Boehmite crystal lattice, that is to say, has a crystalline structure. However, this type of treatment does not always give adequate protection to the coating against corrosion.

Thus, attempts have been made to use sealing baths containing inorganic and/or organic chemicals, such as nickel acetate, dichromates, molybdates, chlorinated paraffin and the like. However, these chemicals have certain attendant disadvantages in that they tend to adversely affect the color of the aluminum oxide, whereby the original bright color of the aluminum is impaired.

In the patent literature, many methods have been proposed for applying organic films onto the aluminum oxide coating. In Pat. No. 2,085,741, which issued on July 6, 1937, relating to the production of an aluminum sound record, the aluminum surface, after cleaning and degreasing, is anodized electrolytically for about 15 to 20 minutes at about 12 amperes per square foot and the anodized surface then contacted with a lubricant, such as stearic acid, and after a suitable interval to permit adsorption, the excess is wiped off. The lubricant is adsorbed into the pores of the oxide coating. In other words, the lubricant is not chemically bonded to the oxide coating and tends to exude from the pores during use. In effect, the application of the lubricant is nothing more than a sealing and plugging technique.

In Pat. No. 2,662,034 (dated Dec. 8, 1953), a method is disclosed for impregnating an aluminum oxide coating with resin by the vapor deposition of the resin into the pores of the oxide coating. The purpose of the resin is to seal off the pores as well as to apply a film over the oxide layer.

Another method which has been proposed for coating aluminum with an organic coating is that disclosed in U.S. Pat. No. 2,916,402 (dated Dec. 8, 1959). The method is especially applied to the coating of aluminum incandescent lamp bases. The bases are prepared by first dipping them in hot water ranging from 80 to 90° C., dried and then dipped in a sperm whale oil emulsion containing a catalyst from the group consisting of naphthenates and linoleates of iron, cobalt, manganese, zinc and lead. Prior to dipping, the part is heated to about 100° C. The purpose of the catalyst is to accelerate the oxidation and hardening of the coating. Apparently, the formation of a foundation oxide coating is not important to the process, since no mention of an oxide coating is made in the patent.

A method for forming organic enamel coatings on magnesium-aluminum alloys is disclosed in U.S. Pat. No. 3,247,026 (dated Apr. 19, 1966) in which an aluminum alloy surface is specially treated with saturated steam to produce a Boehmite aluminum oxide foundation layer to which a coating of an organic enamel is applied and caused to adhere to the surface by baking. The aluminum oxide layer is referred to in the patent as S-Boehmite and has a crystalline structure.

In Pat. No. 2,721,835 (dated Oct. 25, 1955), a method is described in columns 1, 2 and 3 for bonding alkyd resin-base enamels to an aluminum surface by first forming a conventional anodic coating in an aqueous bath containing phosphoric and chromic acids and, without rinsing off the acids, applying an alkyd resin-base enamel to the surface, the residual film of the unrinsed acids being apparently relied upon to effect adherence between the enamel and the metal substrate. The bonding achieved appears to be physical in nature since a conventionally produced anodic layer is involved which is known to be absorptive to organic impregnants.

Crystalline fibrous Boehmite is disclosed in U.S. Pat. No. 3,013,901 (dated Dec. 19, 1961) as a means by which adherent coatings are applied to a substrate. It is described as having the formula AlOOH and as having a crystalline structure as compared to the different amorphous aluminum hydrate mentioned hereinafter. In the case of aluminum, the conventional anodic coating is first produced on the surface thereof and the fibrous crystalline Boehmite then applied to it preliminary to the application of an organic overcoat.

The production of organically dyed aluminum is old in the art. The dyeing is effected by impregnating the pores of a conventionally produced aluminum oxide layer with an organic dye which remains physically bonded within the pores of the oxide layer. Dyed coatings tend to be expensive since they rely on the initial formation of a relatively expensive anodized coating and the additional step of applying the dye, which is a critical step.

While the foregoing methods and many variations thereof have been proposed over the years for modifying the surface of, or for producing protective coatings on aluminum, none, as far as we are aware, has provided the improved products of the present invention characterized by multi-functional and multi-beneficial properties, such as improved resistance to corrosion, improved surface appearance, improved dielectric properties, and such other properties as repairable coatings, self-healing coatings, and the like.

We have now discovered an economical method of producing a wide range and variety of improved surface-modified aluminum products. According to one embodiment of our invention, we can produce strongly, chemically bonded organic films or coatings on aluminum surfaces by employing a simple surface-preparation step prior to the application of the organic film, the strong bonds being obtainable at ordinary temperatures or temperatures other than ambient.

OBJECTS OF THE INVENTION

It is thus the object of the invention to overcome the aforementioned difficulties and disadvantages of the prior art by providing a simple, economical method for improving the surface quality of aluminum.

Another object of the invention is to provide new and novel processes of treating aluminum and forming a stable surface thereon characterized by improved resistance to corrosion.

A still further object is to provide an improved article of manufacture comprising aluminum having an organic film or layer strongly and chemically bonded to the surface thereof.

The invention also provides as an object a process for improving the adherence of organic coatings or films on surfaces of aluminum.

As another object, the invention also provides an improved process for organically modifying or chemically converting aluminum surfaces to enhance the utility of aluminum in a wide variety of applications.

As an additional object, the invention also provides a method for laminating aluminum with plastic coatings, which coatings may be employed in laminating aluminum to aluminum or aluminum to other substrates, such as metals or non-metals.

A further object is to provide an organically modified aluminum surface characterized by improved dielectric properties.

These and other objects will more clearly appear from the disclosure, the illustrative examples and the accompanying drawing, wherein:

FIG. 1 is a reproduction of an electron photomicrograph taken at 200,000 times magnification showing an organic film bonded to aluminum in accordance with the invention;

FIG. 2 illustrates an aluminum panel treated in three sections, one of the sections being treated in accordance with the invention.

STATEMENT OF THE INVENTION

Figure 3:
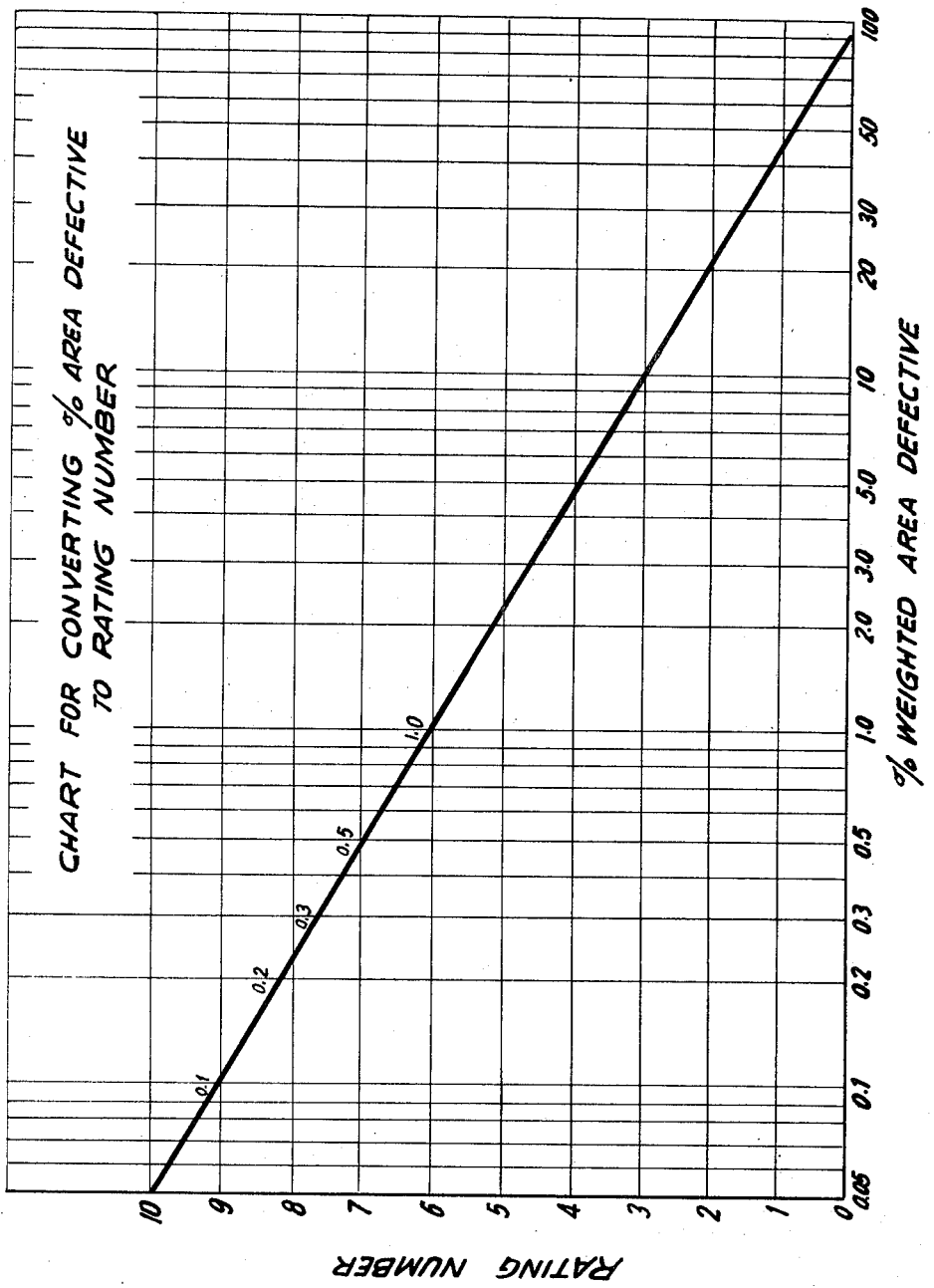
FIG. 3 depicts a corrosion-rating chart for evaluating the corrosion resistance of treated aluminum surfaces.

Broadly stated, the invention provides an improved aluminum surface having chemically bonded to it an organic film comprising at its bonding interface a reaction product of an organic compound and an active hydrated amorphous layer of aluminum oxide integral with the aluminum. The organic compound making up the film has at least 8 carbon atoms and is characterized by a functional group which reacts with aliphatic alcohols, the active hydrated layer of aluminum oxide having the characteristic of being capable of reacting like an alcohol with the functional group of the organic compound. The reaction product formed is further characterized by being substantially insoluble in water.

Thus, two requirements must be fulfilled to achieve the novel results of the invention: (1) the aluminum surface should have an adherent amorphous layer of an active substantially non-porous hydrate of aluminum oxide which is similar to an aliphatic alcohol in its reaction with certain organic compounds; and (2) the organic compound to be applied to the surface should be one whose functional group reacts with an aliphatic alcohol and, therefore, with the active hydrate. For the purpose of this invention, the active amorphous hydrate of aluminum oxide is considered to have an alcohol-like property, although it is realized that the oxide is inorganic in nature. However, we do not wish to be bound to the foregoing alcohol theory just so long as the amorphous hydrate of aluminum oxide integral with the aluminum surface has the property of reacting with the organic coating compound to provide a chemical bond therewith.

The active amorphous layer of hydrated aluminum oxide is produced by first forming an adherent "barrier layer" on the aluminum surface, the hydrate being thereafter immediately formed by reaction with water. The barrier layer is a precursor to the formation of the conventional anodized layer. Its formation and behavior have been the subject of extensive research by many investigators [note M. S. Hunter and P. Fowle, "Determination of Barrier Layer Thickness of Anodic Oxide Coatings," Journal of the Electrochemical Society, 101 (9), pp. 481–485, September 1954]. Following the formation of the barrier layer which is substantially non-porous, further build-up in the coating thickness generally results in a porous oxide layer due to the solvent action of the electrolyte in which it is formed, the degree with which the porous and crystalline layer forms being a function of time, electrolyte composition and concentration, the temperature of the bath and the applied voltage. It is possible, depending upon the foregoing conditions, to form a relatively thick porous oxide coating a few minutes. We have found that the crystalline oxide layer of anodic coatings of this type does not tend to react like an alcohol with the functional groups of organic compounds contemplated by the invention. However, where the barrier layer is formed and its surface allowed to form a hydrate in the presence of water, a very active amorphous layer is provided which chemically reacts with the selected organic compound. An aluminum surface having a natural oxide coating does not behave in this manner.

The organic compounds having at least 8 carbon atoms and which have functional groups which react with aliphatic alcohols include those selected from the group consisting of carboxylic acids, acid anhydrides, phosphinic acids, organic acid phosphates and acid phosphites, which also include those in which at least one oxygen atom may be substituted by sulfur; organic isocyanates, diisocyanates, isothiocyanates and diisothiocyanates; ketenes, ethylene derivatives, comprising compounds of the three-membered heterocyclic ring, such as ethylene oxide derivatives, ethylene imine derivatives and ethylene sulfide derivatives; esters of the type RCOOR′, organic sulfonates, organic sulfates, sulfinic acids, organic carbonates, and the like.

Examples of carboxylic acids which may be employed include those of the fatty acid types referred to generally as $RCO_2H$, $R(CO_2H)_2$ and the anhydrides $(RCO)_2O$. Examples of phosphinic acids are those represented by the formula $R_2P(O)OH$. Among the acid phosphates and phosphites are included the phosphates $(RO)_2P(O)OH$ and $ROP(O)(OH)_2$, the phosphites $(RO)_2POH$ and $ROP(OH)_2$, the thiophosphates $(RO)_2P(S)OH$ and $ROP(S)(OH)_2$ and the thiophosphites $(RS)_2POH$ and $RSP(OH)_2$, among others. The organic isocyanates have the general formula RNCO and the diisocyanates the general formula $R(NCO)_2$. The isothiocyanates have the general formula RNCS and the diisothiocyanates, the formula $R(NCS)_2$. The ketenes are represented by the formula RCH=C=O and the ethylene derivatives by the general heterocyclic ring formula

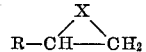

where X may be O (ethylene oxide, e.g. oxirane), or NH (ethylene imine, e.g. aziridine), or S (ethylene sulfide, e.g. thiirane), while the esters are those defined generally by the formula RCOOR′. The sulfonates include

and the sulfates

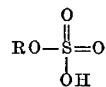

The sulfinic acids have the formula RSOOH. The organic acid carbonates are referred to by the general formula

With regard to the foregoing compounds, R (or R′) may be selected from the group consisting of alkyl, aralkyl, aryl and alkaryl radicals, the compounds being generally of the alkyl types. Unsaturated alkyl compounds are particularly preferred in producing corrosion resistant foundation films due to their tendency to polymerize by oxidation to provide a tough resinous coating.

DETAILS OF THE INVENTION

One method of producing the active amorphous hydrated layer of aluminum oxide preliminary to forming a chemically bonded organic film comprises dipping aluminum in dilute acid, such as 20 volume percent hydrochloric or phosphoric acid until gassing occurs at the aluminum surface. When the barrier layer forms, its surface reacts with the water present to form the amorphous hydrate. Another method of producing the active amorphous hydrate is electrochemically by means of a very short anodic treatment (e.g. usually less than a minute) in an aqueous solution of a mineral acid, such as sulfuric, phosphoric or mixtures thereof. After the amorphous hydrate has been formed by either method, the activated aluminum surface, after rinsing, is contacted with an organic compound (e.g. immersed in an alcohol-water solution of stearyl acid phosphate) whose functional group reacts with the hydrate similar to the manner in which it reacts with an aliphatic alcohol, to form a relatively water-insoluble product at the interface which provides a strong chemical bond between the overlying organic film and the aluminum substrate (after, for example, drying the coating by blowing with hot air).

Another method is to form the active amorphous hydrate layer in a one-step operation on the aluminum in an electrolyte comprising an aqueous bath, for example, an ethanol-water solution containing an effective amount of a dispersion of stearyl acid phosphate, whereby the organic film is formed in situ.

Indications are that the layer of the active hydrate of aluminum oxide is polyamorphous in character and has the following structural formula:

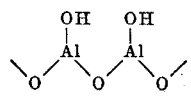

However, the layer need not be all aluminum hydrate. For example, depending upon the acids employed in producing the active hydrate of aluminum oxide, other ions may be present in the layer, such as chromate and/or phosphate ions, so long as there are sufficient sites in the layer of the active amorphous hydrate of aluminum oxide to effect the desired bonding with the applied organic film. Thus, the expression "active amorphous hydrate of aluminum oxide" is meant to include the active hydrate per se or the active hydrate diluted by the presence of other amorphous inorganic compounds, such as chromates and/or phosphates.

Chemical bonding can be effected rather quickly by immersion of the treated aluminum surface in appropriate solutions containing an effective amount of the organic compound, such as an alcohol solution of lauryl acid phosphate (e.g. 3 grams per liter), or by applying the appropriate organic compound directly to the treated surface, such as by wiping with alpha-naphthyl isocyanate or with corn oil. For example, where corn oil is used and after the chemical bond is formed, heat treatment (e.g. 265° F. for about 15 minutes) may be employed to effect oxidation and polymerization of the excess unsaturated acids into a hard, tough resinous coating. However, as stated hereinbefore, the reaction can be effected in a one-step operation, such as by treating the aluminum anodically in a solvent-water electrolyte solution containing an alkyl acid phosphate. Since it does not take much organic compound to cover the aluminum surface, dilute solutions can be employed. Examples of the types of reactions which are believed to be indicated in accordance with the invention between representative functional groups of organic compounds and the amorphous hydrated aluminum oxide to form reaction products substantially insoluble in water are as follows:

ESTER TYPE CHEMICAL BOND FORMED FROM CONDENSATION REACTIONS

Fatty acids of the type $RCO_2H$:

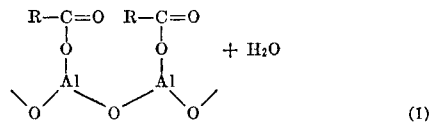
(1)

Alkyl phosphates of the type of $(RO)_2P(O)OH$ and $ROP(O)(OH)_2$:

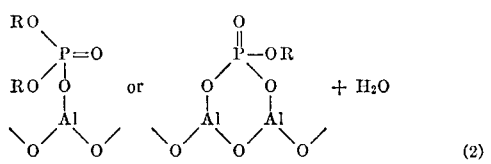
(2)

ETHER TYPE CHEMICAL BOND FORMED FROM CONDENSATION REACTIONS

Alkyl phosphites of the type $(RO)_2POH$ and $$ROP(OH)_2$$

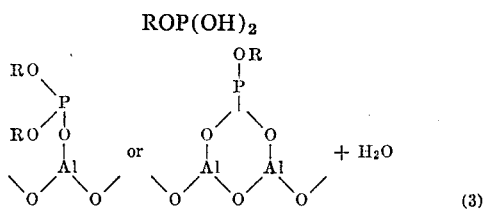
(3)

ESTER TYPE CHEMICAL BOND FORMED FROM ADDITION REACTIONS

Isocyanates of the type RNCO:

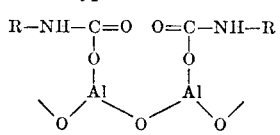
(4)

Ketenes of the type $RCH=C=O$:

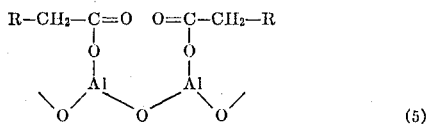
(5)

ETHER TYPE CHEMICAL BOND FORMED FROM ADDITION REACTIONS

Ethylene oxide derivatives of the type

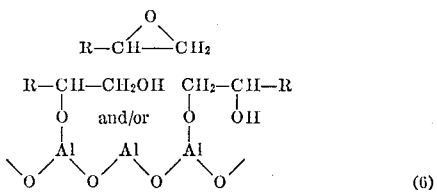
(6)

Ethylene imine derivatives of the type

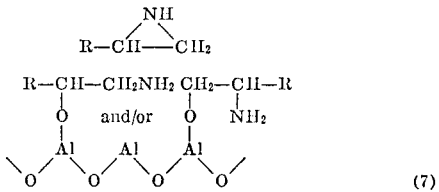
(7)

Ethylene sulfide derivatives of the type

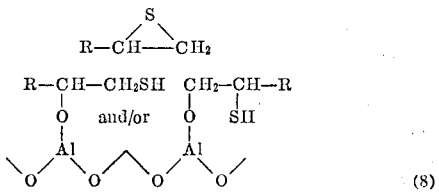
(8)

ESTER TYPE CHEMICAL BOND FORMED FROM TRANSESTERIFICATION REACTIONS

Esters of the type RCOOR'

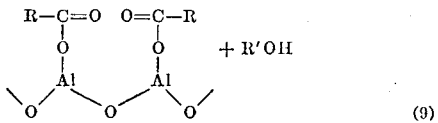
(9)

Other additional formulations are as follows: Alkyl sulfonates of the type:

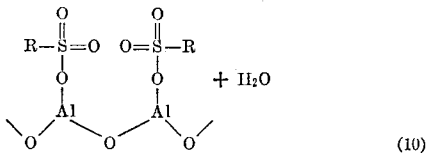
(10)

Aryl sulfonates of the type:

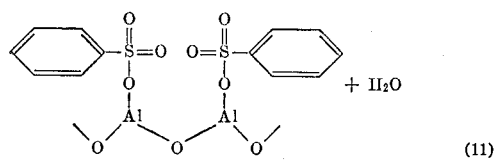
(11)

Alkyl sulfates of the type:

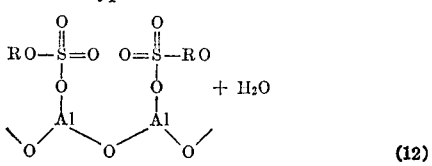
(12)

Tests have indicated that, in general, compounds which were predicted to form protective films on aluminum were effective so long as the R group or radical (e.g. alkyl group) contained at least 8 carbon atoms (e.g. compounds insoluble or slightly soluble in water).

Coatings or films applied with compounds having essentially the same R group but containing functional groups which were not expected to react with the active amorphous hydrate showed inferior resistance to corrosion when treated aluminum panels were exposed to an acid salt spray test referred to as the "CASS" test. This test is accepted standard procedure for evaluating the corrosion resistance of treated aluminum surfaces and the term "CASS" stands for copper-accelerated acetic acid salt spray test identified as ASTM designation 368–64T.

The procedure employed to evaluate corrosion resistance is similar to the ASTM method detailed in the 1953 Committee Report (Proc. Am. Soc. Testing Mat. 53, 265, 1953). The corrosion performance rating is determined by calculating the percent weighted area which is defective and reading the rating from the conversion plot illustrated in FIG. 3.

In making the evaluation, the percent defective area is determined by comparing test specimens with the data of standard charts depicting unit CASS ratings ranging from 0 to 10. Referring to FIG. 3, it will be noted by way of example that a CASS rating of 7 corresponds to a percent weighted defective area of 0.5, and that a CASS rating of 5 corresponds to a percent defective area of 2.0. On the basis of percent weighted defective area, a CASS rating of 7 indicates a fourfold superiority over a CASS rating of 5.

Throughout the disclosure, where organic compounds within the invention are compared as coatings to those outside the invention, three-hour CASS ratings are used in making the determination, as we have found three-hour tests to be sufficient for the evaluation. Where long time effectiveness of the coating is to be evaluated, 17-hour CASS ratings are determined, the 17-hour test being a more rigid evaluation.

Coating evaluation was performed on aluminum panels measuring 2" x 6" and 4" x 6" of thickness about one-eighth of an inch. Examples of aluminum alloys used include those designated by Alloy Numbers 1100, 2025, 3003, 5005, 5557, 6061, 6063, 7075, among others, including aluminum per se.

Examples of organic functional groups which perform in accordance with the invention as compared to those groups which do not, using the CASS test as one of the parameters in making the comparison are given by way of illustration in Table 1 as follows:

Aluminum alloy panels were buffed on one side and, after precleaning, activated anodically in a sulfuric acid-phosphoric acid anodizing bath (about 15 volume percent sulfuric acid and 15 volume percent phosphoric acid). The amorphous hydrate of aluminum oxide was obtained in about 15 seconds of anodic treatment at 85° F. and 12 volts. Generally speaking, the aluminum panels were then soaked for 5 minutes in an ethanol-water solution (25 volume percent ethanol and 75 volume percent water) containing in solution either 3 grams per liter of solid organic compound or 5 ml. per liter where the organic is a liquid. Those aluminum panels not treated in accordance with the above procedure are described in detail in the examples that follow.

As will be observed from the table, the compounds designated as Nos. 1 to 11 exhibited relatively high CASS ratings and good resistance to corrosion, while those listed by the designation A to I exhibited particularly low CASS ratings and were generally poor as to corrosion resistance, the difference in behavior between the two groups of compounds being apparently related to the fact that they differ from each other with respect to their functional groups. Indications are that the amorphous hydrate of aluminum oxide is chemically selective with respect to the functional groups of Compounds 1 to 11 and apparently not so with respect to the functional groups of Compounds A to I.

The following examples are given to illustrate various embodiments of the invention:

EXAMPLE 1

Test 1A

Three grams of stearyl acid phosphate were dissolved in 250 ml. of ethanol at 145° F. and water was added to make up a one liter volume of solution. A buffed aluminum panel (2 inches wide by 6 inches long) identified as Alloy No. 6063 was precleaned by: (1) vapor degreasing in trichlorethylene; (2) soaking in an alkaline cleaning solution (inhibited alkaline cleaner containing basic alkaline salts, surfactants and emulsifying agents) for 90 seconds at 175° F.; (3) water rinsing for 60 seconds at 120° F.; (4) acid dipping in a solution containing 50 volume percent nitric acid for 15 seconds; and (5) water rinsing for 30 seconds at approximately 75° F. After cleaning, the panel was treated anodically for 15 seconds at 11 to 12 volts D.C. and a current density of 15 amp./sq. ft. in a solution containing 15 volume percent sulfuric and 15 volume percent phosphoric acid at 80° F., and rinsed in tap water at 75° F. for 30 seconds and then with distilled water at 78° F. for 15 seconds. This treatment produced an adherent substantially nonporous layer of an active amorphous hydrate of aluminum oxide on the surface. The panel with the amorphous oxide layer was then soaked in an aqueous bath of stearyl acid phosphate for 5 minutes and thereafter the surface was rinsed and forced air dried at about 78° F. The panel with the TABLE 1.—CLASSIFICATION OF ORGANIC FUNCTIONAL GROUPS BASED ON RESISTANCE TO CORROSION

| No. | Functional group evaluated | Illustrative organic compound | Formula | CASS rating (±0.5) | Corrosion resistance |
|---|---|---|---|---|---|
| 1 | Primary acid phosphate | Lauryl acid phosphate | $CH_3(CH_2)_{11}OP(O)(OH)_2$ | 8.5 | Good. |
| 2 | Secondary phosphite | Dilauryl phosphite | $[CH_3(CH_2)_{11}O]_2POH$ | 7.5 | Do. |
| 3 | Simple ester | Methyl stearate | $CH_3(CH_2)_{16}C(O)OCH_3$ | 8.5 | Do. |
| 4 | Ester mixture | Carnauba wax | (1) | 7.5 | Do. |
| 5 | Alkyl isocyanate | n-Octdadecyl isocyanate | $CH_3(CH_2)_{17}NCO$ | 8.5 | Do. |
| 6 | Aryl isocyanate | α-Naphthyl isocyanate | $C_{10}H_7NCO$ | 7.0 | Do. |
| 7 | Monoacid | Lauric acid | $CH_3(CH_2)_{10}C(O)OH$ | 7.0 | Do. |
| 8 | Acid anhydride | Stearic anhydride | $[CH_3(CH_2)_{16}CO]_2O$ | 7.5 | Do. |
| 9 | Phosphinic acid | Diphenylphosphinic acid | $(C_6H_5)_2P(O)OH$ | 7.0 | Do. |
| 10 | Oxirane | 1,2-epoxyoctadecane | $CH_3(CH_2)_{15}CH\overset{O}{-\!\!\!-\!\!\!-}CH_2$ | 9.2 | Do. |
| 11 | Acid carbonate | Dilauryl carbonate | $[CH_3(CH_2)_{11}O]_2CO$ | 7.2 | Do. |
| A | Alcohol | Lauryl alcohol | $CH_3(CH_2)_{10}CH_2OH$ | 4.5 | Poor. |
| B | Tertiary phosphate | Trilauryl phosphate | $[CH_3(CH_2)_{11}O]_3P(O)$ | 4.0 | Do. |
| C | Ketone | 2-undecanone | $CH_3(CH_2)_8C(O)CH_3$ | 3.5 | Do. |
| D | Aldehyde | Laurylaldehyde | $CH_3(CH_2)_{10}C(O)H$ | 3.5 | Do. |
| E | Nitrile | Lauronitrile | $CH_3(CH_2)_{10}CN$ | 3.5 | Do. |
| F | Amine | Laurylamine | $CH_3(CH_2)_{10}CH_2NH_2$ | 3.5 | Do. |
| G | Amide | do | $CH_3(CH_2)_{10}C(O)NH_2$ | 3.0 | Do. |
| H | Unsaturated hydrocarbon | 1-octadecene | $CH_3(CH_2)_{15}-CH=CH_2$ | 3.0 | Do. |
| I | Quaternary ammonium salt | Tridodecylmethylammonium chloride | $[CH_3(CH_2)_{10}CH_2]_3N+CH_3Cl-$ | 3.0 | Do. |

[1] Mixture of esters of normal alcohol and fatty acids having even number of carbon atoms from 24 to 34.

organically modified surface was then subjected to the CASS environment for a 3-hour period. A CASS rating of 8.5 was obtained.

For comparison, a cleaned aluminum panel of the same size and composition anodically treated for 15 seconds to provide the active amorphous hydrate above exhibited a 2.0 rating after 3 hours' exposure to CASS.

Test 1B

Similar tests were conducted with the compounds lauryl acid phosphate, dilauryl phosphite, lauric acid, decanoic acid, myristic acid, and diphenylphosphinic acid, using the same conditions and the same concentrations set forth in Test 1A. The three-hour CASS ratings obtained were as follows:

Table 2

| Compound: | CASS rating |
|---|---|
| Lauryl acid phosphate | 8.5 |
| Dilauryl phosphite | 7.5 |
| Lauric acid | 7.0 |
| Decanoic acid | 6.5 |
| Myristic acid | 6.5 |
| Palmitic acid | 6.5 |
| Diphenylphosphinic acid | 7.0 |

For comparison, a cleaned aluminum panel of the same size and composition anodically treated for 15 seconds at about 80° F. in an anodizing solution of 15 volume percent sulfuric acid and 15 volume percent phosphoric at 11 to 12 volts and a current density of 15 amperes per square foot exhibited a 3-hour CASS rating of 2.0.

EXAMPLE 2

Similarly, as in Example 1, a buffed aluminum panel (2 inches wide by six inches long) identified as Alloy No. 6063 was precleaned by: (1) vapor degreasing in trichlorethylene; (2) soaking in an alkaline cleaning solution for 90 seconds at 175° F.; (3) water rinsing for 60 seconds at 120° F.; (4) acid dipping in a solution containing 50 volume percent nitric acid for 15 seconds; and (5) water rinsing for 30 seconds at 75° F. After cleaning, the panel was treated anodically for 15 seconds at a current density of 15 amp/sq. ft. in a solution containing 15 volume percent sulfuric and 15 volume percent phosphoric acid at about 80° F., and rinsed in tap water at 75° F. for 30 seconds and distilled water at 78° F. for 15 seconds. This treatment produced an adherent substantially nonporous layer of an amorphous hydrate of aluminum oxide on the surface. After drying, the panel with the amorphous oxide layer was then wiped with liquid n-octadecylisocyanate. Excess isocyanate was removed by soaking the panel in distilled water for 30 minutes with occasional stirring. After 3 hours of CASS exposure, the panel exhibited a good corrosion rating of 8.2.

EXAMPLE 3

Linseed oil is a widely used drying oil employed in paints and varnishes. The oil is predominately a mixture of glyceryl esters of linoleic and linolenic acids, which will oxidize and polymerize into a tough resinous coating when exposed to air. This example illustrates that the drying oils, such as linseed oil, can be readily adapted to provide a hard resinous coating when applied in accordance with the invention. Such coatings are useful as electrical insulation on aluminum wire and as adherent foundation coats for subsequent application of paints.

A buffed 2 x 6-inch aluminum panel designated as Alloy 5557 was cleaned and anodically activated for 15 seconds in sulfuric-phosphoric acid solution as described in Example 1. After drying, a thin film of boiled linseed oil was wiped onto the active surface by means of a hand tissue. Similarly, a second aluminum panel that was given a 3-minute anodic treatment, and a third panel that was degreased only, were also coated with the boiled linseed oil. To illustrate that the amorphous hydrated oxide surface can be achieved by acid immersion treatment, a fourth panel was similarly coated after the cleaned panel was immersed in a 20 volume percent phosphoric acid solution at 78° F. until the surface was gassing uniformly, about 2½ minutes. All panels were distilled-water rinsed and dried prior to applying the linseed oil. After coating, all four panels were baked in air for 25 minutes at 275° F. One end of each panel was then bent around a 1-inch diameter rod, after which the panels were exposed to CASS environment for 17 continuous hours. A summary of the corrosion results is shown in the following table. For comparison, a cleaned panel of the same size and the same alloy composition, which was anodized for 20 minutes in the sulfuric-phosphoric acid solution and sealed in boiling distilled water for 15 minutes, is also included in the table.

TABLE 3

| Panel No. | Surface treatment prior to the application of linseed oil | CASS rating Flat area | CASS rating Bend area |
|---|---|---|---|
| 1 | Cleaned and anodically treated for 15 seconds | 9.5 | 8.5 |
| 2 | Cleaned and anodically treated for 3 minutes | 4.0 | 0.5 |
| 3 | Vapor degreased only | 0.6 | 0.6 |
| 4 | Anodized 20 minutes and water sealed—not treated with linseed oil | 7.5 | 5.5 |

The above results confirm the important role played by the amorphous hydrate layer of aluminum oxide, in the production of strongly bonded organic films on aluminum in accordance with the invention. As stated heretofore, where the hydrated barrier layer is formed, a very active amorphous oxide is provide which chemically reacts with selected organic compounds as exhibited by the 15-second anodic treatment given Panel 1. On the other hand, further anodic treatment after the formation of the barrier layer results in producing a porous oxide layer which we have experimentally found not to be as reactive, as exhiibted by the 3-minute anodic treatment given Panel 2. Panel 3, which was vapor degreased only prior to the application of linseed oil, exhibited very poor CASS results (0.6). A panel cleaned and acid dipped to produce an active layer of amorphous hydrate of aluminum oxide exhibited a CASS rating of 4.5 in the flat area and 4.2 in the bend area, being superior to both Panel 2 and Panel 3.

As can be seen by comparing the corrosion ratings of the flat and bent areas of each individual panel, the panel with the short anodic treatment (Panel 1) resulted in a resinous coating having very good flex-resistance. Panel 4, which corresponds to conventionally anodized aluminum, exhibited a drop in CASS rating from 7.5 to 5.5 percent weighted area defective increase of 0.3 to 1.5, at the bent position corresponding to a five-fold increased in percent weighted area defective). Panel 1, on the other hand, exhibited a drop in CASS rating of from 9.5 to only 8.5 at the bent portion, thus showing that the polymerized linseed coating of the invention is strongly bonded to the aluminum substrate while also exhibiting good flex-resistance.

An advantage of working with linseed oil is that after the reaction product has formed with the amorphous hydrate to provide a strongly bonded foundation layer followed by curing at 275° F., further layers can be applied by merely dipping in linseed oil and curing so as to build up any desirable thickness, since the additionally applied linseed oil is compatible with the foundation layer. This technique is applicable to other types of unsaturated aliphatic carboxylic acid esters, such as china wood oil, oiticica oil, soybean oil, and the like.

As stated hereinabove, coatings based on linseed oil may have utility as insulation for aluminum wire in electrical applications. Wire may be coated continuously by passing it through a degreaser; soaking it in an alkaline cleaner; passing it through a water rinser; dipping in an acid solution, then water rinsing; short time anodizing to form the active amorphous hydrate of aluminum oxide;

water rinsing; applying linseed oil; baking at an elevated temperature in air to cure the coating; applying additional linseed oil followed by further curing; and the linseed application and curing repeated until the desired thickness of coating is obtained. The final overall coating will be strongly adherent to the wire in view of the strong interfactial chemical bond formed during the earlier stages of the surface treatment.

EXAMPLE 4

This example illustrates how ester-type organic compounds can be used to modify an aluminum surface to improve its resistance to corrosion.

Test 4A

A buffed 2 x 6-inch aluminum panel designated by Alloy 6063 was cleaned as described in Example 1, and then one-half of the panel was anodically activated for 15 seconds at a current density of 15 amp./sq. ft. and 11–12 volts in a sulfuric-phosphoric acid bath containing 15 volume percent of each acid. An active amorphous hydrate of the aluminum oxide was obtained which was then rinsed in distilled water. After drying, carnauba wax was applied to both the anodically activated and cleaned areas of the panel by wiping with cotton. The carnauba wax is a mixture of esters of normal alcohols and fatty acids having an even number of carbon atoms from 24 to 34. A fatty acid ester of carnaubyl alcohol, $C_{24}H_{49}OH$, is illustrative of one type of carnauba wax. This ester has the general formula RCOOR'. Since, at ordinary temperatures, carnauba wax is a solid, the wax and panel were heated to 180° F. prior to the application. After the application the panel was exposed to CASS environment for 3 continuous hours. A corrosion rating of 8.0 was obtained on that portion of the panel which contained the amorphous hydrated oxide. In contrast, the cleaned but nonactivated part of the panel had a CASS rating of 5.0.

Test 4B

In this illustration, methyl stearate which is the ester of stearic acid and methyl alcohol was employed to organically modify the surface of aluminum. A 2 x 6-inch, 6063 aluminum alloy panel was cleaned and anodically activated in sulfuric-phosphoric acid solution as described in Example 1. The panel with the amorphous hydrated oxide surface was then immersed for 5 minutes in an ethanol solution which contained 3 g./l, of the methyl stearate. Following the immersion treatment, the panel was forced air (300° F.) dried without rinsing, and subjected to CASS environment for 3 hours. A CASS rating of 8.5 was obtained. In contrast, another aluminum panel of the same size and alloy composition that was similarly treated with the exception that the panel was not anodically activated exhibited a poor CASS rating of 2.5.

Test 4C

Similarly, a transesterification reaction was effected with dilauryl carbonate, which is represented by the formula $[CH_3(CH_2)_{11}O]_2CO$. The liquid dilauryl carbonate was applied to the panel, one half of which contained the hydrated aluminum surface, by wiping it on with cotton. Following the application, the panel was treated with hot forced air (300° F.) for 45 seconds to effect the reaction, after which the panel was subjected to CASS environment for 3 hours. A good CASS rating of 7.2 was obtained on the treated half. The untreated half exhibited a poor CASS rating of 3.0.

EXAMPLE 5

This example illustrates the usefulness of employing electrolytic techniques to provide a corrosion resistant alkyl-phosphate conversion coating in a one-step operation.

Effective amounts of three grams of lauryl acid phosphate and 3 grams of stearyl acid phosphate were dissolved in 600 ml. of ethanol and water was added to make up a 2-liter dispersion. A buffed and vapor degreased 2 x 6-inch aluminum panel identified as Alloy No. 6063 was alkaline cleaned by soaking the panel for 90 seconds at 175° F. in an alkaline commercial-cleaning solution. After water rinsing in tap water for 20 seconds at 78° F., the panel was made the anode in the foregoing solution. The panel was anodically treated at a voltage of 110 v. and a current of 450 ma. which decreased to 210 ma. during a 1-minute treatment time. After this period, the current was turned off and the panel was then removed and forced-air dried at 300° F. without rinsing. After scribing scratches in the organic coating, the panel was subjected to the CASS environment for 17 hours. The panel exhibited a CASS rating of 8.6, and only a very slight amount of corrosion was noted in the scratches, which indicated that the alkyl-phosphate coatings are self-healing.

For comparison, a cleaned aluminum panel of the same size and composition was then anodized in a solution containing 15 volume percent phosphoric acid and 15 volume percent sulfuric acid at a temperature of about 78° F. and a current density of 15 amp/sq. ft. for 20 minutes. Following the anodizing treatment, the panel was rinsed in distilled water and then sealed by submerging it in boiling distilled water for 15 minutes. The oxide coating of the panel was then scribed with scratches, after which the panel was exposed to CASS environment for 17 hours. The panel exhibited a CASS rating of 7.0. A copious amount of pitting and corrosion product was noted around the scratches. On the comparison basis of the percent weighted area defective, the organic coating was 3.3 times better than the conventional anodized surface (0.15 vs. 0.5).

Thus, the panel treated with lauryl and stearyl acid phosphates was markedly superior.

A similar test was conducted with a panel of Alloy No. 6061, one-third of the panel after cleaning being treated in accordance with the invention as described in Example 5 for a total time of 5 minutes, another third of the panel being untreated, and the last third being cleaned, anodized and water sealed for a total treating time of 40 minutes. After scribing a scratch across the whole panel, the panel was CASS tested for 17 hours (note FIG. 2). As will be noted, the first third of the panel treated in accordance with the invention was markedly superior. As will be further noted, the scratch had no effect on the corrosion resistance of that part of the panel treated in accordance with the invention.

EXAMPLE 6

This example illustrates that alternating currents can be usefully employed to electrolytically effect an alkyl-phosphate conversion coating in a one-step operation.

Two buffed and vapor degreased 2 x 6-inch, 6062 aluminum alloy panels were cleaned by soaking the panels for 90 seconds at 175° F. in a commercial-cleaning solution (inhibited alkaline cleaner containing basic alkaline salts, surfactants and emulsifying agents). After water rinsing in tap water for 30 seconds at 78° F., the panels were made electrodes in the lauryl and stearyl acid phosphate solution described in Example 5. An A-C voltage of 110 volts was then applied for a 2-minute period. During this treatment time, the current decreased from an initial 28 amp./sq. ft. to 14 amp./sq. ft. The panels were then removed and forced-air (300° F.) dried without rinsing after which the panels were subjected to CASS environment for 17 continuous hours. A CASS rating of 8.5 was obtained for each panel.

It should be noted that the corrosion resistance of the A-C applied coating was equivalent to the corrosion resistance of the same coating applied electrolytically using D-C voltage as in Example 5.

EXAMPLE 7

The object of this example is to demonstrate that the invention is applicable to pure aluminum or its alloys. Buffed specimens of Alloy Nos. 6063, 5557, 3003, 6061, 5005, 7075, 2025, 1100 and pure aluminum were cleaned and electrolytically treated in an ethanol-water dispersion of lauryl and stearyl acid phosphates as described in the one-step procedure of Example 5. After forced-air (300° F.) drying, the specimens were exposed to a CASS environment for 17 continuous hours. As can be seen by the following CASS ratings, the alkyl phosphate coatings provided good corrosion resistance for all alloys investigated.

TABLE 4

| Aluminum alloy No. | Specimen size, inches | CASS rating, 17 hours |
|---|---|---|
| Pure Al | ½ x 3 | 8.2 |
| 6063 | 2 x 6 | 7.6 |
| 5557 | 2 x 6 | 8.5 |
| 3003 | 4 x 6 | 8.6 |
| 6061 | 4 x 6 | 8.2 |
| 5005 | 4 x 6 | 8.5 |
| 7075 | 4 x 6 | 7.5 |
| 2025 | 4 x 6 | 7.0 |
| 1100 | 4 x 6 | 8.2 |

EXAMPLE 8

An oxirane, 1,2-epoxyoctadecane having the formula

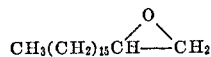

was prepared from 1-octadecene by the method of Swern, Billen, and Scanlan, Journal American Chemical Society, 68, p. 1504 (1946). After preparation, the oxirane was applied in its melted state to a buffed 2 x 6-inch 6063 aluminum alloy panel, one-half of which contained a continuous layer of the active amorphous hydrate of aluminum oxide. The active hydrated layer was produced electrochemically as described in Example 1. As shown in Table 1, a good CASS rating of 9.2 after 3 hours was obtained on the treated half of the panel which indicates that a strong chemical bond was achieved. The cleaned but otherwise untreated half exhibited a low rating of 3.0.

In contrast, the application of the 1-octadecene to a similarly treated aluminum panel resulted in a poor CASS rating of 3.0 after 3 hours' exposure to the copper-accelerated acetic acid salt spray environment.

These results show that ethylene derivatives represented by the general heterocyclic ring formula

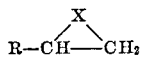

where X may be O, NH, or S, will produce adherent organic films or coatings on aluminum substrates treated in accordance with the invention.

EXAMPLE 9

As illustrative of phosphinic acids, diphenylphosphinic acid having the formula $(C_6H_5)_2P(O)OH$ was similarly tested by applying the acid to an active substrate of aluminum produced electrolytically as described in Example 1. The acid was applied using a solution similar to the type prepared in Example 1, except that the phosphinic acid replaced the stearyl acid phosphate. As shown in Table 1, this acid resulted in a chemically bonded film having a good CASS rating of 7.

EXAMPLE 10

Stearic acid anhydride was applied to a hydrated aluminum surface by melting it and wiping it on with cotton as described in Test 4A. A good CASS rating of 7.5 was obtained.

EXAMPLE 11

This example illustrates that the amorphous hydrate form of aluminum oxide is chemically selective with respect to its reactivity with selected organic functional groups. Groups that ordinarily do not react with an aliphatic alcohol do not react with the amorphous form of the hydrated aluminum oxide.

Lauraldehyde is an example of an alkyl organic compound that contains at least 8 carbon atoms and is characterized by a functional group which does not ordinarily react with an aliphatic alcohol. In attempting to apply an adherent conversion coating with lauraldehyde, a buffed 2 x 6-inch, Alloy 6063 panel was cleaned and anodically treated for 15 seconds in sulfuric-phosphoric acid solution as described in Example 1 for providing an active amorphous hydrated oxide surface. The panel was then immersed in a 25 volume percent ethanol-water solution containing 5 ml. per liter of the lauraldehyde for a 5-minute period at 78° F. After this treatment, the panel was distilled-water rinsed and air dried at 75° F., and subjected to CASS environment for 3 hours. A poor CASS rating of 3.5 was obtained.

Similarly, as shown in Table 5 below, poor CASS ratings were obtained in experiments with other organic compounds which contained functional groups that do not ordinarily react with an aliphatic alcohol such as trilauryl phosphate (4.0), lauryl alcohol (4.5), laurylamide (3.0), 2-undecanone (3.5), lauronitrile (3.5), 1-octadecene (3.0), and laurylamine (3.5).

Other organic groups shown in Table 5 which have been experimentally shown to be ineffective are 1-octadecene, and a highly polar quaternary ammonium salt, such as tridodecylmethyl-ammonium chloride. Application of the 1-octadecene has been described in Example 8. The quaternary ammonium salt was applied to the amorphous hydrated aluminum oxide surface in its melted state.

TABLE 5

| Organic compound | CASS rating | Corrosion resistance |
|---|---|---|
| Lauraldehyde | 3.5 | Poor. |
| Trilaurylphosphate | 4.0 | Do. |
| Lauryl alcohol | 4.5 | Do. |
| Laurylamide | 3.0 | Do. |
| 2-undecanone | 3.5 | Do. |
| Lauronitrile | 3.5 | Do. |
| Laurylamine | 3.5 | Do. |
| 1-octadecene | 3.0 | Do. |
| Tridodecylmethylammonium chloride* | 3.0 | Do. |

*This compound was applied to the pretreated aluminum surface as described in Test 4A of Example 4.

It is clearly apparent by comparing Examples 1 to 10 (within the invention) with Example 11 (outside the invention) that improved results of the invention are achieved so long as the organic compounds have functional groups which will react with the active amorphous hydrate of aluminum oxide.

In an attempt to characterize the coating or film obtained using the invention, a section of an aluminum panel provided with a film of lauryl acid phosphate produced in accordance with Example 1 was examined under an electron microscope and a photomicrograph obtained at 200,000 times magnification. The examination (note FIG. 1) indicated that the film thickness 10 was of the order of about 240 angstroms (about 8 molecules thick). It is significant that the micrograph revealed an underlayer structure of non-porous oxide barrier layer 11 of about 1500 angstroms in thickness. However, despite the fact that the thickness of the organic film was only 240 angstroms, a good CASS rating of about 8.5 was obtained, which indicates that the film is dense, non-porous, and substantially impenetrable by the ambient environment. The film is very adherent and strongly bonded to the barrier layer as evidenced by the simple test of bending a portion of the coated panel completely about a 1-inch diameter before exposing the panel to the CASS environment. The unbent portion exhibited a CASS reading of 8.5, while the bent portion still exhibited a good reading of at least 7. It is recalled that a conventionally anodized and sealed panel, when bent prior to the CASS test, exhibited a rating of only 5 at the bent portion. For comparison, a conventionally anodized aluminum substrate taken at 200,000 times magnification revealed a porous oxide structure.

As has been stated earlier, the active hydrate on the aluminum surface need not be all aluminum hydrate in order to achieve the results of the invention. Depending upon the acids or salts employed in producing the active hydrate of aluminum oxide, other ions may be present in the layer, such as chromate and/or phosphate ions, so long as there are sufficient sites of active amorphous hydrate to effect the desired bonding with the applied organic film. As illustrative of the foregoing, the following example is given:

As is well known by those skilled in the art of chemical oxidation processes, conversion coatings produced on aluminum substrates using chromate-phosphate solutions usually contain chromium and phosphorous ions as well as an appreciable amount of aluminum ions. Such coatings are known to be compact and amorphous, and to resemble hydrated oxide coatings as opposed to resembling the conventional crystalline structure which, for example, is usually obtained in metal-phosphate processes. These coatings, which contain the amorphous hydrate of aluminum oxide, will react with the organic compounds of the type described herein with regard to the invention.

To illustrate the foregoing, eight 2 x 6-inch, 3003 aluminum alloy panels were provided with an amorphous chromate-phosphate coating after which 4 organic compounds of Table 1, which were shown to react with the amorphous hydrate of aluminum oxide, were applied to one-half of four respective panels. Similarly, 4 organic compounds of Table 1 containing functional groups outside the invention were applied to one-half of each of the remaining four panels. The organic compounds selected are listed in Table 6. A commercially available acid chromate-phosphating solution was used in preparing the specimens using prescribed procedures. Coatings obtained in the proprietary solutions are noncrystalline and a part of the substrate metal. The organic application was performed by soaking the bottom half of each panel for 5 minutes in a solution containing 25 volume percent ethanol, 75 volume percent distilled water, and 3 grams per liter solid organic compound or 5 ml. per liter liquid organic compound, respectively. The organically treated panels were then rinsed with cold water (78° F.) and forced air dried at 78° F. Since isocyanates will react with water, the liquid n-octadecyl isocyanate was applied by wiping with cotton after which the excess isocyanate was removed by soaking the panel in distilled water for 30 minutes with occasional stirring.

Following the application of the organic compounds, the panels were exposed to CASS environment for 3 hours after which the effectiveness of the resulting coatings to electrical conductivity were evaluated with a Z-scope impedance measuring unit. The chromate-phosphating solution used in preparing the specimen provides a coating that is electrically conductive. Thus, any substantial increase achieved in resistivity in the organically coated area of the panels would indicate that a chemical bond had been achieved.

The result of the experimental work is summarized in Table 6. As would be expected, a marked increase in impedance ranging as high as 1,150% was obtained with organic compounds having functional groups that are known to react with aliphatic alcohols, such as the phosphite, isocyanate, phosphate, and monoacid compounds. On the other hand, the treatment of the chromate-phosphate coating with organic compounds having functional groups that were not expected to react (nitrile, ketone, aldehyde and amine) resulted in obtaining little or no increase in resistivity.

Thus, it is clearly apparent by comparing the impedance value of the nine specimens shown in Table 5 that improved results of the invention are achieved when an active amorphous hydrated oxide surface condition is produced on aluminum.

TABLE 6

| Organic compound [1] applied | Functional group | Impedance, [2] K ohms | | |
|---|---|---|---|---|
| | | Organically treated area | Untreated area | Percent increase or decrease |
| Dilauryl phosphite | Phosphite | 10.0 | 0.80 | +1,150 |
| n-Octadecyl isocyanate | Isocyanate | 7.5 | 0.70 | +975 |
| Lauryl acid phosphate | Phosphate | 1.75 | 0.63 | +180 |
| Stearic acid | Monoacid | 1.40 | 0.72 | +94 |
| Lauronitrile | Nitrile | 0.80 | 0.60 | +33 |
| 2-undecanone | Ketone | 0.75 | 0.72 | +0.42 |
| Laurylaldehyde | Aldehyde | 0.64 | 0.75 | −14.6 |
| Laurylamine | Amine | 0.48 | 0.56 | −21.5 |

[1] A chromate-phosphate conversion coating was applied on a 2 x 6-inch 3003 aluminum alloy specimen, after which one-half of the area was treated with an organic compound.
[2] Impedance (kilo ohms) to 1-volt, alternating current measured for a 0.1 sq. cm. area with a Z-scope, the Twin City Testing Company, Tonawanda, New York.

Tests have shown that in formulating baths containing effective amounts of stearyl acid phosphate or lauryl acid phosphate or both, it is advantageous to employ ethanol along with water as a solvent. The presence of ethanol aids in avoiding or inhibiting the electrophoretic deposit of a rather thick powdery deposit upon the pretreated aluminum substrate. Further tests have indicated that either glycol or 2-propanol may be effectively substituted for ethanol in alkyl acid phosphate baths. The lower vapor pressure of these two solvents is desirable in preventing excessive loss of solvent due to evaporation.

One of the advantages of employing the one-step electrolytic process of producing the organically modified surface of the invention is that a rather large section, such as corrugated sheet, can be coated, even though one portion of the sheet may have a different current density from the other. For example, a one foot square corrugated aluminum alloy type 3003 panel (corrugations bent at 90° angles) was electrolytically treated in a solution containing equal amounts of lauryl acid phosphate and stearyl acid phosphate using 2-propanol with water as the solvent in place of ethanol, the panel being first cleaned in the usual manner. The sheet as the anode was coated for a 1-minute period with another 1-minute solution soak with the power off, which resulted in a 13-hour CASS rating of about 8.8 in the high current density areas, and 6.5 in the low current density areas. However, extending the coating time to 2.5 minutes with no solution soak resulted in obtaining a panel having a 17-hour CASS rating of about 8.2 in the high current density areas and 7.5 in the low current density areas. The data indicate that a relatively prolonged treatment period in a one-step operation does not adversely affect the high current density areas. This would be expected since a high resistance preferentially develops in the high current density areas which tends to inhibit further electrolytic action. Thus, irregular aluminum shapes are capable of being treated in accordance with the invention.

Production of laminates on aluminum

As will be apparent, the invention is also useful in providing aluminum with an adherent foundation layer upon which thicker layers can subsequently be developed. For example, the foundation layer may serve as an intermediate layer in the production of plastic laminated aluminum strip or sheet or in the production of aluminum laminated to aluminum; or a plastic film having the desired functional group may be bonded directly to the amorphous hydrate via a reaction product between the hydrate and the functional group.

Polyester films, vinyl chloride, and the like, may be bonded directly with heat and pressure or with adhesives. It is known that vinyl chloride films laminated to aluminum, provided good adherence is obtained, exhibit excellent toughness and wear resistance. These laminates not only offer all the advantages of a prefinished material but, because of their excellent characteristics, they can be fabricated by almost any conventional method. The laminates, for example, can be easily bent, crimped, embossed, drilled, formed, perforated, punched and sheared without damage to the laminated coating.

The laminations can be produced in many combinations of color, design, texture, etc. An advantage of plastic laminates is that they can simulate the texture of linen, alligator skin, wood and other non-aluminum products. Such simulated products find a wide range of application in luggage and cases of all types, interiors of autos, airplanes, rail cars, and the like, ceilings, wall and door panels, boat decks, seats and trim applications for residential and commercial buildings, business machine housings and other office equipment. Aluminum, being naturally corrosion resistant to the elements, is superior as a substrate over ferrous metals which rust easily. An important use of plastic laminated aluminum sheets is the use of polyester coatings on aluminum. One method of producing a strongly bonded polyester coating is given in the following example.

EXAMPLE 12

A buffed aluminum panel (2 x 6-inch in size and one-sixteenth of an inch thick) identified as type 3003 was pre-cleaned as in Example 1 and one-half of the panel then treated anodically for 15 seconds at about 11 to 12 volts D.C. and a current density of 15 amps/sq. ft. in a solution containing 15 volume percent sulfuric acid and 15 volume percent phosphoric acid at 80° F., and rinsed in tap water at 75° F. for 30 seconds and then with distilled water at 78° F. for 15 seconds. This treatment produced an adherent substantially non-porous layer of an active amorphous hydrate of aluminum oxide on the surface.

A polyester film 1¾" x 5" and 0.002 inch thick, known by the trademark 'Mylar,' was laid down upon the whole surface of the panel and pressed into place using a spatula made of polytetrafluoroethylene ("Teflon") while the panel was supported on a hot plate at about 480° F. for 90 seconds. The panel was then removed and allowed to cool. The panel exhibited a bright aluminum color. The coating was tested for adherence by prying with a knife. The polyester coating initially appeared to be adherent.

The coated panel was then subjected to a 17-hour CASS test, followed by washing in distilled water. The adherence after the CASS test was again tested by prying with a knife and it was found that: (a) the polyester film attached to the anodically untreated half of the panel exhibited poor adherence, whereas (b) the polyester film attached to the half of the panel with the active amorphous hydrate of aluminum oxide exhibited good adherence due to the chemical bond between the functional group of the polyester compound and the amorphous hydrate.

As another embodiment, the methods provides, a laminated product comprising aluminum on aluminum which, in cross section, comprises a plurality of aluminum substrates, an active hydrated amorphous layer of aluminum oxide integral with each of the substrates, an organic foundation film chemically bonded to each of the amorphorus oxide layers via a reaction product of the oxide layer and an organic compound having at least 8 carbon atoms and being characterized by a functional group which reacts with an aliphatic alcohol, the active amorphous oxide layer being characterized chemically as reacting like an alcohol with the functional group, each of the aluminum substrates being bonded to the other by bonding contact at the organically reacted interface. The foundation film may be a polymerized layer to which plastic films may be bonded.

Another use of the invention is in providing strongly adhering lubricating films on aluminum for use in mechanically working aluminum into desired shapes, such as the deep drawing of aluminum sheet or the drawing of intermediate products, such as wire, wire rod, tubes, and the like, through drawing dies. The desired organic film can be applied to the aluminum substrate in the manner described in the foregoing examples.

Summarizing the foregoing, the invention provides a method whereby a homogeneous organic film is chemically bonded via a reaction product to aluminum surfaces. This film, the properties of which will depend on the organic compound employed, may act as a protective coating, for example, in resisting corrosion, or may be employed as a foundation film in subsequent processing steps. Thus, the foundation film may be employed as an intermediate layer in laminating plastics to aluminum substrates, or provide a base for the application of paints, enamels, epoxy resins, and the like coatings. For example, because of the nature of the original bond, built-up coatings with or without pigments can be produced to provide markedly improved resistance to corrosion, markedly improved electric properties (e.g. dielectric properties), resistance to abrasion, etc. Preferably, the foundation film should be one capable of being polymerized. For example, the film may be derived from unsaturater hydrocarbons, such as unsaturated compounds of the alkyl group.

The advantage of the chemically bonded film as a barrier coating is that oxygen and/or moisture diffusion into the substrate metal can be greately inhibited. Thus, the coating thickness need not be as large as the coating thickness generally required to achieve the desired results.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An aluminum surface having bonded thereto an organic film of an organic compound characterized by a functional group through which bonded is effected with an active hydrated amorphous barrier layer of aluminum oxide integral with the aluminum surface, said organic compound having at least 8 carbon atoms and being characterized in that said functional group is capable of reacting with an aliphatic alcohol, the active hydrated barrier layer of aluminum oxide being characterized as behaving like an alcohol with respect to said functional group in producing a strong bond therewith.

2. An aluminum surface having bonded thereto an orgaic film of an organic compound characterized by a functional group through which bonded is effected with an active hydrated amorphous barrier layer of aluminum oxide integral with the aluminum surface, said organic compound having at least 8 carbon atoms and being characterized in that said functional group is capable of reacting with an aliphatic alcohol, the active hydrated barrier layer of aluminum oxide being characterized as behaving like an alcohol with respect to said functional group in producing a strong bond therewith, said organic compound being selected from the group consisting of: carboxylic acids and acid anhydrides thereof; phosphinic acids; organic acid phosphates and acid phosphites including those in which at least one oxygen atom may be substituted by sulfur; organic isocyanates, diisocyanate; isothiocyanates and diisothiocyanates; ketenes; ethylene derivatives of the three-membered heterocyclic ring

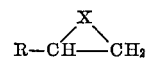

where X may be O, NH or S; esters of the type RCOOR'; organic sulfonates; organic sulfates; sulfinic acids; and organic carbonates.

3. The aluminum surface of claim 2, wherein said organic compounds include acids of the type $RCO_2H$, $$R(CO_2H)_2$$

acid anhydrides of the type $(RCO)_2O$; phosphinic acids of the type $R_2P(O)OH$; acid phosphates of the type $(RO)_2P(O)OH$ and $ROP(O)(OH)_2$; acid phosphites of the type $(RO)_2POH$ and $ROP(OH)_2$; thiophosphates of the type $(RO)_2P(S)OH$ and $ROP(S)(OH)_2$; thiophosphites of the type $(RS)_2POH$ and $RSP(OH)_2$; isocyanates and diisocyanates of the type $RCNO$ and $R(NCO)_2$; isothiocyanates of the type $RNCS$, and diisothiocyanates of the type $R(NCS)_2$; ketenes of the type $RCH=C=O$; ethylene oxide derivatives of the type

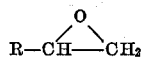

ethylene imine derivatives of the type

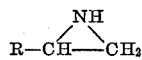

ethylene sulfide derivatives of the type

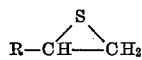

organic sulfonates of the type

organic sulfates of the type

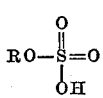

sulfinic acids of the type $RSOOH$; and organic carbonates of the type

R and R' being selected from the group consisting of alkyl, aralkyl, aryl and alkaryl radicals.

4. An aluminum article of manufacture having bonded to the surface thereof an organic film of an organic compound characterized by a functional group through which bonding is effected with an active hydrated amorphous barrier layer of aluminum oxide integral with the aluminum surface, said organic compound having at least 8 carbon atoms and being characterized in that said functional group is capable of reacting with an aliphatic alcohol, said active hydrated layer of aluminum oxide being characterized as behaving like an alcohol with respect to said functional group in producing a strong bond therewith.

5. The article of manufacture of claim 4, wherein said organic compound is selected from the group consisting of: carboxylic acids and acid anhydrides thereof; phosphinic acids; organic acid phosphates and acid phosphites including those in which at least one oxygen atom may be substituted by sulfur; organic isocyanates, diisocyanates, isothiocyanates and diisothiocyanates; ketenes; ethylene derivatives of the three-membered heterocyclic ring

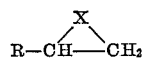

where X may be O, NH or S; esters of the type $RCOOR'$; organic sulfonates; organic sulfates, sulfinic acids; and organic acid carbonates.

6. The article of manufacture of claim 5, wherein said organic compounds include acids of the type $RCO_2H$, $R(CO_2H)_2$; acid anhydrides of the type $(RCO)_2O$; phosphinic acids of the type $R_2P(O)OH$; acid phosphates of the type $(RO)_2P(O)OH$ and $ROP(O)(OH)_2$; acid phosphites of the type $(RO)_2POH$ and $ROP(OH)_2$; thiophosphates of the type $(RO)_2P(S)OH$ and $ROP(S)(OH)_2$; thiophosphites of the type $(RS)_2POH$ and $RSP(OH)_2$; isocyanates and diisocyanates of the type $RNCO$ and $R(NCO)_2$; isothiocyanates of the type $RNCS$, and diisothiocyanates of the type $R(NCS)_2$; ketenes of the type $R-CH=C=O$; ethylene oxide derivatives of the type

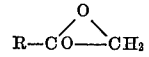

ethylene imine derivatives of the type

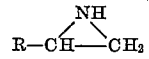

ethylene sulfide derivatives of the type

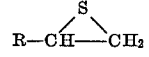

esters of the type $RCOOR'$; organic sulfonates of the type

organic sulfates of the type

sulfinic acids of the type $RSOOH$; and organic carbonates of the type

R and R' being selected from the group consisting of alkyl, aralkyl, aryl and alkaryl radicals.

7. The article of manufacture of claim 4, wherein the organic compound is an alkyl acid phosphate.

8. The article of manufacture of claim 7, wherein the alkyl acid phosphate is at least one compound selected from the group consisting of stearyl acid phosphate and lauryl acid phosphate.

9. A method of bonding to an aluminum surface an organic film consisting essentially of an organic compound containing at least 8 carbon atoms having a functional group capable of reacting with an alcohol which comprises, forming an active hydrated amorphous barrier layer of aluminum oxide integral with said aluminum surface, said active hydrated amorphous barrier layer being characterized as behaving like an alcohol with respect to the functional group of said organic compound in producing a strong bond therewith, and uniformly coating the surface of said integral active hydrated amorphous barrier layer with a film of said organic compound whereby to produce an organic coating strongly bonded to said aluminum surface.

10. The method of claim 9, wherein the aluminum surface is coated with an organic compound selected from the group consisting of: carboxylic acids and acid anhydrides thereof; phosphinic acids; organic acid phosphates and acid phosphites including those in which at least one oxygen atom may be substituted by sulfur, organic isocyanates, diisocyanates, isothiocyanates and diisothiocyanates; ketenes; ethylene derivatives of the three-membered heterocyclic ring

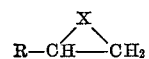

where X may be O, NH and S; esters of the type $RCOOR'$; organic sulfonates; organic sulfates; sulfinic acids and organic carbonates.

11. The method of claim 10, wherein the organic compounds include acids of the type $RCO_2H$, $R(CO_2H)_2$; acid anhydrides of the type $(RCO)_2O$; phosphinic acids of the type $R_2P(O)OH$; acid phosphates of the type $(RO)_2P(O)OH$ and $ROP(O)(OH)_2$; acid phosphites of the type $(RO_2POH$ and $ROP(OH)_2$; thiophosphates of the type $(RO)_2PS(OH)$ and $ROP(S)(OH)_2$; thiophosphites of the type $(RS)_2POH$ and $RSP(OH)_2$; isocyanates, diisocyanates of the type RNCO and $R(NCO)_2$; isothiocyanates of the type RNCS and diisothiocyanates of the type $R(NCS)_2$; ketenes of the type $RCH=C=O$; ethylene oxide derivatives of the type

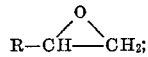

ethylene imine derivatives of the type

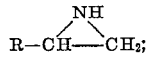

ethylene sulfide derivatives of the type

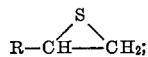

esters of the type RCOOR'; organic sulfonates of the type

organic sulfates of the type

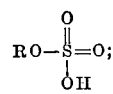

sulfinic acids of the type RSOOH and organic carbonate; R and R' being selected from the group consisting of alkyl, aralkyl, aryl and alkaryl radicals.

12. The method of claim 9, wherein the hydrated amorphous layer of aluminum oxide is produced by contacting the aluminum surface with an aqueous solution of a mineral acid for a time until gassing occurs at the surface, following which the surface is rinsed.

13. The method of claim 9, wherein the hydrated amorphous layer of aluminum oxide is produced by making the aluminum surface an anode in an aqueous solution of a mineral acid for a time sufficient to form the active amorphous hydrated barrier layer of aluminum oxide.

14. The method of claim 13, wherein the aluminum anode is treated for less than about one minute.

15. A method of forming on an aluminum article a strongly bonded organic film from an organic compound containing at least 8 carbon atoms having a functional group capable of reacting with an alcohol which comprises, subjecting the article anodically to the action of an aqueous bath containing said organic compound whereby an active hydrated amorphous barrier layer of aluminum oxide is formed in situ on the surface of said article characterized of behaving like an alcohol with respect to said functional group of said organic compound and produce an organic coating of said organic compound strongly bonded to said aluminum article.

16. The method of claim 15, wherein said organic compound is selected from the group consisting of: carboxylic acids; acid anhydrides thereof; phosphinic acids; organic acid phosphates and acid phosphites including those in which at least one oxygen atom may be substituted by sulfur; organic isocyanates, diisocyanates, isothiocyanates and diisothiocyanates; ketenes; ethylene derivatives of the three membered heterocyclic ring

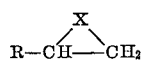

where X may be O, NH and S; esters of the type RCOOR'; organic sulfonates; organic sulfates; sulfinic acids; and organic carbonates.

17. The method of claim 16, wherein said organic compounds include acids of the type $RCO_2H$, $R(CO_2H)_2$, acid anhydrides of the type $(RCO)_2O$; phosphinic acids of the type $R_2P(O)OH$; acid phosphates of the type $(RO)_2P(O)OH$ and $ROP(O)(OH)_2$; acid phosphites of the type $(RO)_2POH$ and $ROP(OH)_2$; thiophosphates of the type $(RO)_2PS(OH)$ and $ROP(S)(OH)_2$; thiophosphites of the type $(RS)_2POH$ and $RSP(OH)_2$; isocyanates and diisocyanates of the type RNCO and $R(NCO)_2$; isothiocyanates of the type RNCS, diisothiocyanates of the type $R(NCS)_2$; ketenes of the type $RCH=C=O$; ethylene oxide derivatives of the type

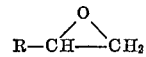

ethylene imine derivatives of the type

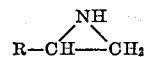

ethylene sulfide derivatives of the type

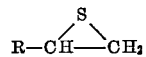

esters of the type RCOOR'; organic sulfonates of the type

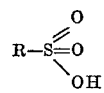

organic sulfates of the type

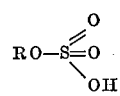

sulfinic acids of the type RSOH; and organic carbonates of the type

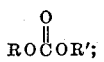

R and R' being selected from the group consisting of alkyl, aralkyl, aryl and alkaryl radicals.

18. The method of claim 15, wherein the organic compound is an alkyl acid phosphate.

19. The method of claim 18, wherein the alkyl acid phosphate is at least one compound selected from the group consisting of stearyl acid phosphate and lauryl acid phosphate.

20. A method of bonding to an aluminum surface an organic film of at least one organic compound selected from the group consisting of stearyl acid phosphate and lauryl acid phosphate which comprises, producing an adherent active hydrated amorphous barrier layer of aluminum oxide on said aluminum surface and then uniformly coating the oxide surface with said at least one organic compound, whereby to produce a strong bond with said surface.

References Cited
UNITED STATES PATENTS

| | | | |
|---|---|---|---|
| 2,721,835 | 10/1955 | Axtell | 204—38 A |
| 3,039,899 | 6/1962 | Keller et al. | 148—6.27 X |
| 3,100,728 | 8/1963 | Vullo et al. | 148—6.15 |
| 3,210,184 | 10/1965 | Uhlig | 204—38 AX |
| 3,257,244 | 6/1966 | Barkman | 204—35 NX |
| 3,365,377 | 1/1968 | Michelson | 148—6.27 X |
| 3,567,597 | 3/1971 | Hovey et al. | 204—58 |

(Other references on following page)

UNITED STATES PATENTS

| | | | |
|---|---|---|---|
| 2,080,299 | 5/1937 | Benning et al. | 259—105 X |
| 2,297,929 | 10/1942 | Wise | 117—134 X |
| 2,662,034 | 12/1953 | Mason et al. | 117—49 X |
| 2,721,835 | 10/1955 | Axtell | 117—49 X |
| 2,762,694 | 9/1956 | Newman | 117—49 X |
| 2,814,576 | 11/1957 | Zickendraht et al. | 117—127 |
| 2,831,782 | 4/1958 | Zvanut | 117—127 |
| 2,963,391 | 12/1960 | Kubie | 117—134 X |
| 3,016,339 | 1/1962 | Riou | 117—49 X |
| 3,030,249 | 4/1962 | Shollenberger et al. | 161—214 X |
| 3,108,015 | 10/1963 | Thompson et al. | 117—134 |
| 3,192,092 | 6/1965 | Schonhorn | 156—332 |
| 3,216,956 | 11/1965 | Craig | 117—134 X |
| 3,392,117 | 7/1968 | Glasson | 117—134 X |
| 3,468,701 | 9/1969 | Hughes | 117—134 X |
| 3,481,814 | 12/1969 | Salyer et al. | 156—330 X |
| 3,490,987 | 1/1970 | Bauriedel | 117—127 X |
| 3,494,806 | 2/1970 | Teumac | 117—49 |

OTHER REFERENCES

Anon., "Finishes for Aluminum," Reynolds Metals, Louisville, Ky. (1947), pp. 69, 70, 78 and 79 relied on.

Wernick et al., "Surface Treatment . . . of Aluminum . . ." Draper, Teddington, Eng. (1956), pp. 163–168 relied on.

Skeist, Irving, Handbook of Adhesives, Reinhold, New York (1962), pp. 333–338 relied on.

Taylor et al., Metals Handbook, Am. Soc. for Metals, Metals Park, Ohio (1964), pp. 615, 616, 621, 627, 628, 629, 630 and 634.

WILLIAM J. VAN BALEN, Primary Examiner

C. E. LIPSEY, Assistant Examiner

U.S. Cl. X.R.

117—49, 75, 89, 127, 134; 148—31.5; 161—190, 213, 214, 218; 204—14, 29, 33, 38, 58

UNITED STATES PATENT OFFICE
CERTIFICATE OF CORRECTION

Patent No. 3,734,784                  Dated May 22, 1973

Inventor(s) Sigmund Bereday, et al.

It is certified that error appears in the above-identified patent and that said Letters Patent are hereby corrected as shown below:

Column 20, line 41, change "bonded" to -- bonding --;

line 52, change "bonded" to -- bonding --.

Column 23, line 2, change "$RO_2POH$" to -- $(RO)_2POH$ --.

Signed and sealed this 8th day of January 1974.

(SEAL)
Attest:

EDWARD M. FLETCHER, JR.          RENE D. TEGTMEYER
Attesting Officer                 Acting Commissioner of Patents